United States Patent Office 2,800,824
Patented July 30, 1957

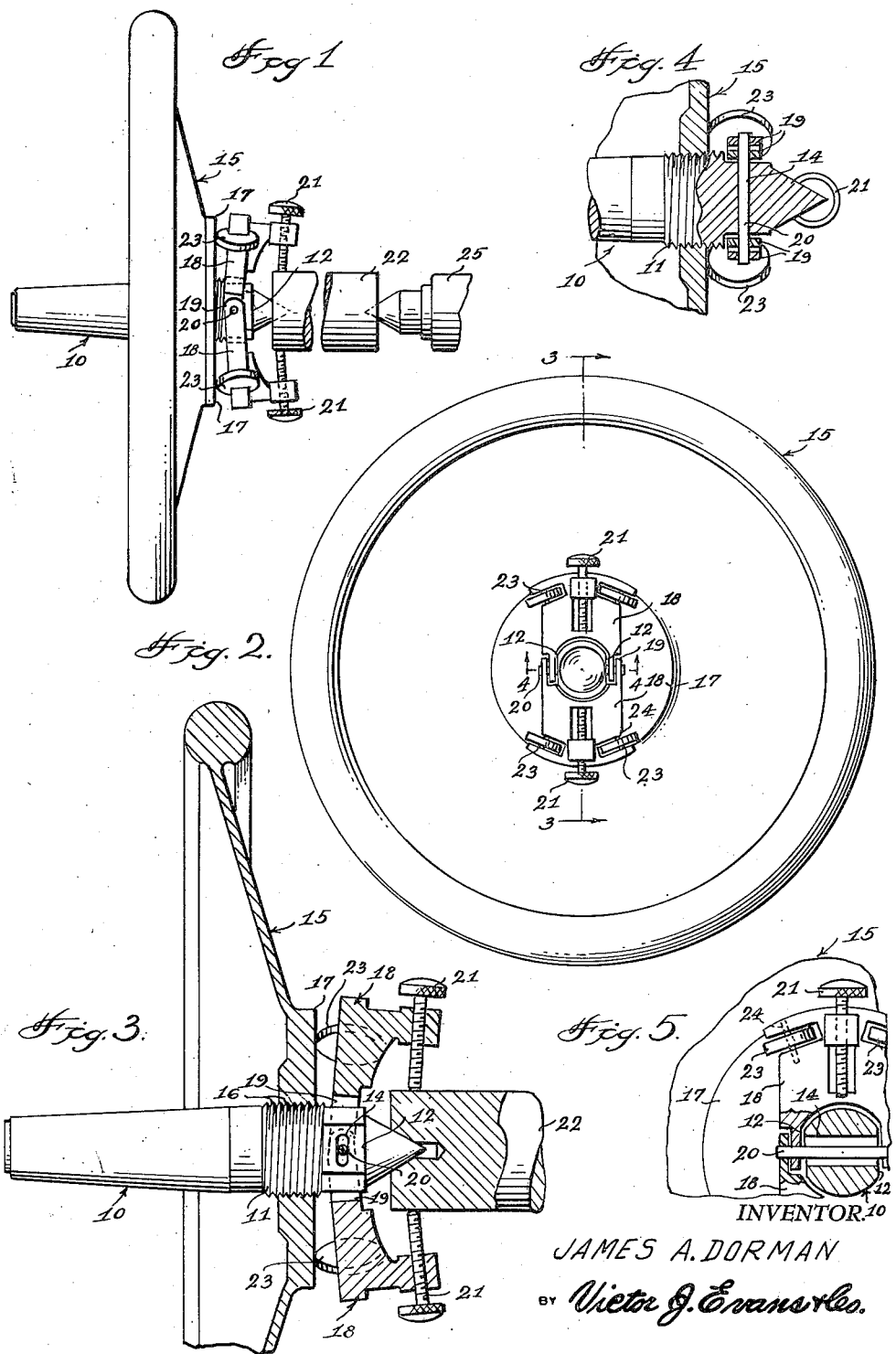

2,800,824

AUTOMATIC WORK DRIVER OR LATHE DOG

James A. Dorman, Elsie, Mich.

Application January 18, 1955, Serial No. 482,637

3 Claims. (Cl. 82—40)

This invention relates to a lathe, and more particularly to an automatic work driver or lathe dog.

The object of the invention is to provide a tool which is adapted to be used on a lathe in lieu of a conventional lathe dog and dog plate whereby small lathes will be furnished with increased stability and momentum.

Another object of the invention is to provide a tool which serves as a combination center, lathe dog and dog plate and wherein there is provided a well balanced arrangement which is easily applied to the lathe.

A further object of the invention is to provide an automatic work driver or lathe dog which is extremely simple and inexpensive to manufacture.

Other objects and advantages will be apparent during the course of the following description.

In the accompanying drawings, forming a part of this application, and which like numerals are used to designate like parts throughout the same:

Figure 1 is a side elevational view of the automatic work driver or lathe dog of the present invention engaging a work piece, and with the work piece shown broken away and in section.

Figure 2 is an end elevational view of the tool of the present invention.

Figure 3 is a sectional view taken on the line 3—3 of Figure 2.

Figure 4 is a sectional view taken on the line 4—4 of Figure 2.

Figure 5 is a fragmentary end elevational view, with parts broken away and in section.

Referring in detail to the drawings, the numeral 10 designates a solid lathe center which is provided with an external left hand threaded portion 11. The center 10 includes two parallel flattened side portions 12, and extending between the side portions 12 is an elongated hole or opening 14.

The numeral 15 designates a handwheel which is free running upon the center 10, and the handwheel 15 is provided with a threaded bore 16 which engages the threaded portion 11 of the center 10. The handwheel 15 is further provided with a hard and flat surface 17 on its forward central portion which defines a pressure plate.

A pair of matching mounting blocks 18 are hingedly connected to the center 10 through the medium of a pin 20, and each of the blocks 18 is provided with a pair of apertured ears 19 through which extend the pin 20, the pin 20 also extending through the hole 14. Each of the blocks 18 carries a driving screw 21 which bears against the work 22. In addition, the mounting blocks 18 each have rotatably connected thereto by means of pins 24, rollers 23, Figure 5. In operation the rollers 23 are in contact with the pressure plate 17 and the rollers 23 are free running upon their mounting pins 24. The numeral 25 designates the conventional tailstock center.

From the foregoing it is apparent that there has been provided an automatic work driver or lathe dog. The tool of the present invention can be used to replace the conventional lathe dog and dog plate as well as to furnish small lathes with stability and momentum. The assembly of the present invention is well balanced, and the tool can be quickly applied and serves to cut down the operating time on centered parts especially on production runs. Furthermore, it is compact, simple and automatically closed upon the work. The center 10 is threaded with the left hand thread 11 and is milled flat on the two parallel sides 12 which have the elongated hole 14 extending therebetween. The blocks 18 are hingedly connected to the center 10 by means of the pin 20.

The operation is as follows: the center 10 is placed in the lathe spindle as any center is as when a dog and dog plate are to be used. The work 22 is then placed between the centers and the driving screws 21 are lightly adjusted to the work. The lathe is now started and the handwheel 15 because it is free running upon the center 10, and by its own inertia, hesitates momentarily to rotate, which causes it to be screwed forward until the surface 17 comes into forceful contact with the rollers 23. This is in turn transmits this force to the drivers 21 which creates a jamming effect against the work 22 causing the work to rotate at the speed of the lathe. A very powerful holding force is obtained which will overcome exceptional resistance from the machining operation, and it will remain until the operator turns the machine off and loosens the drivers 21 by rotating the handwheel 15 in the reverse direction.

The hole 14 is elongated so as to permit the pin 20 to shift slightly permitting the mounting blocks 18 with the drivers 21 to correct or compensate for any irregularity in the work, or else if the centering holes are not perfectly located in the stock, such variation will be compensated for. Furthermore, the elongated hole 14 relieves any strain at the hinged connection and the work cannot then be crowded off of true center.

The advantages of the present invention are as follows: there is provided a combination center, lathe dog and dog plate, as well as a well balanced arrangement which is easily applied to the lathe and which can be turned very much faster and without vibration and with greater accuracy than with a conventional dog. Furthermore, there will be a great saving in production time, since no other tool is required, and the work is merely placed between the centers and the lathe is ready to go and when the cut has been made a slight reverse turn of the handwheel 15 frees the drivers 21 for removal of the work. On small high speed lathes the handwheel 15 is essentially a flywheel which adds stability and sturdy momentum to the machine. The tool will handle, besides round stock, practically any shape such as hexagonal, square, octagonal or irregular by tightening the wheel 15 by hand. The tool may also be used where the centering hole would have to be drastically removed away from true center as in cams and the like. When only one or a few parts are to be run, this tool exceeds or excels the conventional dog because it can be run so much faster and without crowding the center and it takes even less time to apply it to the job. Further, there are no intricate or hard to clean parts or recesses and the tool is readily dismantled for dressing the center point or for any other reason. The construction is simple whereby the sale of the tool can be priced low for purchase in small shops. A streamline construction can be utilized. The hole 14 through which the hinge pin 20 passes is an elongated slot and has its longitudinal axis at right angles to the axis of the tool and its minor dimension is a free fit for the hinge pin 20. The holes or apertures in the ears 19 are tight press fits on the pin 20 and this permits the blocks 18 to have radial motion about the pin while the whole assembly can float laterally with respect to the axial line.

The tool is adapted to be used on engine lathes and replaces the conventional dog and dog plate as applied to work which is turned on centers. At slow speeds and for heavy cutting the drivers 21 are set tightly upon the work 22 by manually turning the handwheel 15. For high speed work and lighter cutting, the procedure is slightly different. The tool can be readily applied to the engine lathe without any special skill. In operation the dogs or screws 21 bear forceful contact with the work piece 22 from the pressure transmitted to them from the handwheel 15 and this force is proportional to the extent to which the handwheel is tightened.

The tool is applied to the job in the following manner: the center 10 is inserted into the headstock spindle or into a proper sleeve if the spindle is larger or other than a No. 3 Morse. Preferably the point is indicated to assure accurate seating and then the work piece 22 is placed between the centers and the tailstock center is brought up snugly. Then, the wheel 15 is screwed forward just enough to contact the rollers 23 in the blocks 18 when the blocks are held in line or slightly forward. Now, the dogs 21 are lightly adjusted against the work 22 and these are carefully equalized. At this point it is to be noted that the blocks 18 can be shifted easily. This shifting is possible because the hinge pin 20 for the blocks passes through the slot 14 which permits considerable lateral freedom to the pin. This freedom is lateral only and serves to relieve any reasonable stress or unequal pressure of the dogs against the work. The tool can, and at the precise instant of locking, equalize and adapt itself to prevent crowding the work. It is therefore necessary to see that the hinge pin floats as nearly as possible between the extremes of this allowed freedom and to lock the dogs 21 so that they will retain this relation. The tool is then ready for use.

In operation and from this point where proper adjustment has been made, and if the work is to be turned slowly for heavy cuts, the dogs 21 must be set up tightly by manually turning the wheel 15 in a clockwise direction. The amount of tightening is governed by the operator and is proportional to his needs which in turn are governed by the type of metal being worked, the cutting rate, the type and condition of the tool bit and other conditions relative to the job. It should be tight enough to prevent slippage which might score the point, the center drilled holes, the work, or damage to a tool bit. The cut is now completed and the piece can then be replaced by another. To release the work, first rotate the handwheel 15 in a counterclockwise direction just enough to permit freedom and then loosen the tailstock center and remove the piece.

For high speed work the procedure is the same except that when the piece is placed on the centers, the handwheel is left one quarter to one-half a turn loose so that when the machine is started the wheel, by its own inertia, will hesitate momentarily to rotate with the assembly and by this will be screwed forward very forcefully until it strikes the rollers on the blocks 18 to thereby transmit a positive and powerful gripping action to the driving dogs without any assistance from the operator.

With the present invention no time is lost to handling wrenches, dogs or other tools and a minimum of time is required for changing from one piece to the next.

I claim:

1. In an automatic work driver or lathe dog, a lathe center provided with a left hand externally threaded portion, said center being provided with a pair of spaced parallel flat portions, there being an elongated hole extending between said flat portions, a handwheel mounted on said center and threadedly engaging the threaded portion thereof, a pair of mounting blocks each having a pair of apertured ears, a securing element extending through the hole in said center and through said registering apertured ears, a driving screw carried by each of said mounting blocks for engagement with a work piece, said handwheel including a forward central portion defining a pressure plate, and rollers rotatably connected to said mounting blocks for engagement with said pressure plate.

2. In an automatic work driver or lathe dog, a lathe center, a handwheel mounted on said center, a pair of mounting blocks pivotally connected to said center, screws carried by said blocks for engagement with a work piece, and rollers rotatably connected to said blocks for engaging said wheel.

3. In an automatic work driver or lathe dog, a lathe center provided with an externally threaded portion, said center being provided with a pair of flat portions, there being a hole extending between said flat portions, a handwheel mounted on said center and threadedly engaging the threaded portions thereof, mounting blocks each having a pair of apertured ears, a securing element extending through the hole in said center and through said registering apertured ears, a driving screw carried by each of said mounting blocks for engagement with a work piece, said handwheel including a portion defining a pressure plate, and rollers rotatably connected to said mounting blocks for engagement with said pressure plate.

References Cited in the file of this patent

UNITED STATES PATENTS

| | | |
|---|---|---|
| 913,594 | Wehner | Feb. 23, 1909 |
| 2,693,966 | Chasar | Nov. 9, 1954 |